United States Patent [19]
Tokioka et al.

[11] Patent Number: 5,610,838
[45] Date of Patent: Mar. 11, 1997

[54] COORDINATE INPUT DEVICE FOR CALCULATING A COORDINATE OF AN INPUT POSITION OF AN APPLIED VIBRATION

[75] Inventors: Masaki Tokioka, Fujisawa; Atsushi Tanaka, Kawasaki; Yuichiro Yoshimura, Kamakura; Ryozo Yanagisawa, Chiba-ken; Katsuyuki Kobayashi; Hajime Sato, both of Yokohama, all of Japan

[73] Assignee: Canon Kabushiki Kaisha, Tokyo, Japan

[21] Appl. No.: 366,919

[22] Filed: Dec. 30, 1994

[30] Foreign Application Priority Data

Jan. 12, 1994 [JP] Japan ..................... 6-001556

[51] Int. Cl.$^6$ ..................................... G01M 7/00
[52] U.S. Cl. ................. 364/508; 367/907; 345/177
[58] Field of Search ..................... 364/508, 560, 364/561, 569, 571.01, 571.03; 178/18, 19; 367/137, 907; 345/179, 173, 174, 177

[56] References Cited

U.S. PATENT DOCUMENTS

| 4,845,684 | 7/1989 | Garwin et al. | 367/137 |
| 4,886,943 | 12/1989 | Suzuki | 178/18 |
| 4,931,965 | 6/1990 | Kaneko | 364/560 |
| 5,097,915 | 3/1992 | Yoshimura et al. | 178/18 |
| 5,352,856 | 10/1994 | Tanaka et al. | 178/18 |

OTHER PUBLICATIONS

Patent Abstracts of Japan, vol. 17, No. 419 (P-1585), Aug. 4, 1993 (corresponding to JP-A-05-080920, Apr. 2, 1993).
Research Disclosure No. 30459, Aug. 1989, Havant GB, p. 599.

*Primary Examiner*—James P. Trammell
*Attorney, Agent, or Firm*—Fitzpatrick, Cella, Harper & Scinto

[57] ABSTRACT

A shift of an input coordinate by a change in temperature in a coordinate input device is prevented. An arithmetic operation and control circuit 1 applies a drive signal to a vibration pen 3 and starts a timer. The drive signal applied to the vibration pen 3 is delayed by a delay circuit 12, which drives a vibrator drive circuit 2 to generate vibration. A delay time of the delay circuit 12 is shortened as a temperature rises and a sum time of the delay generated by the delay circuit 12 and a delay generated in the vibration pen 3 as the temperature changes is constant regardless of the temperature. As a result, a vibration propagation time measured by the timer represents a net propagation time plus a constant delay time regardless of the temperature. Thus, the stable coordinate input is assured regardless of the temperature.

4 Claims, 7 Drawing Sheets

COORDINATE INPUT DEVICE FOR CALCULATING A COORDINATE OF AN INPUT POSITION OF AN APPLIED VIBRATION

BACKGROUND OF THE INVENTION

1. Field of the Invention

The present invention relates to a coordinate input device for detecting a coordinate indicated by a vibration pen, by detecting a vibration generated from the vibration pen with a sensor provided on a vibration transmission plate.

2. Related Background Art

FIG. 2 shows a block diagram of a configuration of an ultrasonic type coordinate inputting device. In FIG. 2, numeral 1 denotes an arithmetic operation and control circuit for controlling the overall device as well as calculating a coordinate position. Numeral 2 denotes a vibrator drive circuit for driving a vibrator 4 in a vibration pen 3. A drive signal from the arithmetic operation and control circuit 1 is supplied to the vibrator drive circuit 2 as a pulse signal, which is amplified with a predetermined gain by the vibrator drive circuit 2, and applied to the vibrator 4. The electrical drive signal is converted a mechanical vibration by the vibrator 4 and it is transmitted to a vibration transmission plate 8 through a pen tip 5. The vibration transmitting plate 8 is made of a transparent member such as acryl or glass plate, and a coordinate is inputted by the vibration pen 3 by touching the vibration transmitting plate 8.

By contacting and indicating an area A shown by a solid line (effective area) by the vibration pen 3, the vibration generated in the vibration pen 3 is applied to the vibration transmission plate 8 and the inputted vibration is detected by vibration sensors 6a to 6d. The detected vibration is converted to an electrical signal by the vibration sensor 6 and processed by a signal waveform detection circuit 9 to extract arrival timings of the vibration to the respective sensors 6a to 6d. A time offset obtained in advance is subtracted from a time period from the drive timing of the drive signal to the arrival timing of the vibration. The subtracted value is processed as a vibration propagation time required for propagating over the vibration transmission plate 8 to thereby calculate the distances from the point indicated by the vibration pen 3 to the respective vibration sensors 6a to 6d. A coordinate position is calculated based on the plurality of determined pen-sensor distances in a manner similar to a triangulation.

The time offset obtained in advance is a sum of a time to which the same amount of offset contributes in all vibration sensors 6a to 6d such as a time required for propagating in the pen tip 5 of the vibration pen 3 and arriving the tip end of the pen tip 5, and a time in which the amount of offset differs between the vibration sensors 6a to 6d such as a delay time generated in the signal waveform detection circuit 9 or a response time of the vibration sensors 6a to 6d, and it is a time which exists without regard to the actual vibration propagation time.

In order to prevent (reduce) the propagated vibration from being reflected by an end plane of the vibration transmission plate 8 and returning to a center, a vibration-proof member 7 is provided on an outer periphery of the vibration transmission plate 8. The arithmetic operation and control circuit 1 calculates a coordinate at a vibration transmission timing extracted by the signal waveform detection circuit 9 and outputs the coordinate data to a display circuit 10 to display it on a display 11 such as a liquid crystal display. The display 11 is arranged behind the vibration transmitting plate 8 and displays a dot at a position touched by the vibration pen 3 so that it is viewed through the vibration transmitting plate (transparent member) 8.

FIG. 3 shows a block diagram of a prior art arithmetic operation and control circuit 1. The respective elements and the operations thereof are described below.

In FIG. 3, numeral 31 denotes a microcomputer for controlling the arithmetic operation and control circuit 1 and the overall coordinate input device and it comprises an internal counter, a ROM for storing an operation procedure, a RAM used for calculation and a nonvolatile memory for storing a constant or the like. Numeral 33 denotes a timer (which may comprise counter) for counting a reference clock, not shown, and it starts the counting when a start signal for starting the drive of the vibrator 4 in the vibration pen 3 is applied to the vibrator drive circuit 2. Thus, the start of the counting is synchronized with the detection of the vibration by the sensor and the delay time before the detection of the vibration by the sensors 6a to 6d is measured.

The vibration arrival timing signals from the vibration sensors 6a to 6d outputted by the signal waveform detection circuit 9 are applied to latch circuits 34a to 34d through a detection signal input port 35. The latch circuits 34a to 34d correspond to the vibration sensors 6a to 6d, respectively. Upon receiving the timing signals from the corresponding sensors, the latch circuits 34a to 34d latch the current counts of the timers. When a judgement circuit 36 determines that all detection signals have been received, the circuit 36 outputs to the microcomputer 31 a signal to that effect. When the microcomputer 31 receives the signal from the judgement circuit 36, it reads by the latch circuits the vibration arrival times from the latch circuits 34a to 34d to the respective vibration sensors and performs a predetermined calculation to thereby determine a coordinate position of the vibration pen 3 on the vibration transmitting plate 8. Thus, a dot is displayed at the corresponding position on the display 11 through an I/O port 37. Alternatively, the coordinate position information may be outputted to an interface circuit through the I/O port 37 to output the coordinate data to an external device.

FIG. 4 shows a block diagram of the signal waveform detection circuit 9. In the present construction is used a principal that Lamb wave propagating through the vibration transmitting plate 8 is utilized to measure a group delay arrival time and a phase delay arrival time of the vibration to attain high precision output of the coordinate position.

FIG. 5 shows waveforms for illustrating an operation of the signal waveform detection circuit 9. Referring to FIGS. 4 and 5, an operation with one vibration sensor 6a is explained. The operation is same for other vibration sensors 6b to 6d.

The measurement of the vibration transmitting time to the vibration sensor 6a is started simultaneously with the drive signal to the vibrator drive circuit 2, and a drive signal 41 is sent from the arithmetic operation and control circuit 1. The vibration generated in the vibration pen 3 in response to the signal 41 propagates by taking a time corresponding to the distance to the vibration sensor 6a, thereafter, is detected by the vibration sensor 6a. The signal of which the vibration is detected by the vibration sensor 6a is amplified by a preamplifier 51 to produce a detection signal waveform 42. Since Lamb wave is used in this construction, a relative relationship between a phase and an envelope in the detected waveform relative to the propagation distance in the vibration transmitting plate 8 will change.

Assuming that a group velocity is Vg and a phase velocity is Vp, the distance between the vibration pen 3 and the vibration sensor 6a can be detected from the group velocity Vg and the phase velocity Vp.

For a group delay time tg, the velocity is Vg and the distance d between the vibration pen and the vibration sensor 6a is given by:

$$d = Vg \cdot tg \quad (1)$$

This formula is for one (6a) of the vibration sensors but the distances between other three vibration sensors 6b to 6d and the vibration pen 3 can be expressed by the same formula.

Processing based on the detection of the phase signal is further conducted.

The distance between the vibration sensor and the vibration pen is calculated using the phase delay time tp:

$$d = n \cdot \lambda p + Vp \cdot tp \quad (2)$$

where λp is a wavelength of an elastic wave and n is an integer.

From the formulas (1) and (2), the integer n is expressed as $$n = [(Vg \cdot tg - Vp \cdot tp)/\lambda p + \alpha] \quad (3)$$

where α defines a margin to the calculation of n and an appropriate value is used. For example, when α=½ is set, n may be determined if a variation of Vg·tg is within ±½ wavelength relative to a reference. The n thus determined is substituted in the formula (2), thereby precisely measuring the distance between the vibration pen 3 and the vibration sensor 6a.

In this manner, the distance between the vibration pen 3 and the vibration sensor 6a can be precisely measured by detecting the group delay time tg and the phase delay time tp. Signals 47 and 49 for measuring the two vibration transmission times tg and tp are finally outputted from the signal waveform detection circuit 9. (The process therefor is explained below in sequence.)

In FIG. 4, only an envelope 421 is extracted from the detection signal 42 by an envelope detection circuit 52. The envelope 421 is differentiated two times by an inflection point detection circuit 53 comprising a two-stage differentiation circuit to convert a rising inflection point of the input envelope to a first falling zero-crossing point of the output waveform, and a two times-differentiated signal 43 is outputted.

The detection signal 42 is filtered by a bandpass filter 55 to eliminate extra frequency components of the detection signal to produce a filtered output signal 44.

On the other hand, a signal detection circuit 56 produces a pulse signal 45 for a portion which exceeds a predetermined threshold signal 441 (hereinafter referred to as a compare level) in the filtered output signal 44. A monostable multivibrator 57 opens a gate signal 46 having a predetermined duration, which is triggered by the first rise of the pulse signal 45. The gate signal 46 serves as an operation switch for a tg comparator 54 and a tp comparator 59. The tg comparator 54 detects the first falling zero-crossing point (which corresponds to the rising inflection point of the envelope as described above) of the two times-differentiated signal 43 while the gate signal 46 is open, so that the group delay arrival signal tg 49 is supplied to the arithmetic operation and control circuit 1. The tp comparator 59 detects the first rising (or falling) zero-crossing point of the filtered signal 44 sliced by a slicing circuit 58 while the gate signal 46 is open and the phase delay arrival time signal tp 47 is supplied to the arithmetic operation and control circuit 1.

In the present construction, the phase delay arrival time signal tp 49 is measured until the first rise so that it is less affected by the reflection, but the second or later rise may be measured depending on a construction. The slicing circuit 58 merely slices the waveform in order to maintain the input level to the comparator constant and to stabilize an output characteristic of the comparator.

There is a problem that when a surrounding temperature of the device changes, the time from the drive timing to the arrival timing changes and the coordinate calculation includes an error. Major factors therefor are as follows:

a) The time for the vibration to propagate in the pen tip 5 changes due to a change in temperature of the pen 3, and the time corresponding to the above-mentioned time offset obtained in advance changes. Since the pen tip 5 is made of polyamide plastic by taking a feeling of manipulation of the vibration pen 3, that is, a feeling of writing into consideration, a sound velocity in the material significantly changes according to the temperature.

b) The frequency of the vibration generated in the vibration pen 3 changes as the temperature of the vibration pen 3 changes. Since the vibration propagated in the vibration transmitting plate 8 is Lamb wave, the propagation velocity thereof changes according to the frequency. As a result, the propagation velocity of the vibration changes.

c) The time delay of the circuit changes by the change in temperature of the signal waveform detection circuit 9. This is caused by the characteristic of significant change of a switching speed of a semiconductor device in the circuit according to the change in temperature. By using a semiconductor device having two order higher switching speed for the frequency of the vibration, the change in performance by the temperature may be suppressed but cost will increase.

Besides the above three points, the change in propagation speed by the change in temperature (even with the constant frequency) and the change in response of the sensor may be considered as the factors but they are significantly smaller than the above three points.

The changes in the arrival timing caused by the above three points appear as change in the same direction, that is, as the temperature rises, the arrival timing is delayed, and as the temperature falls, the arrival timing is advanced. When the frequency of the vibration generated in the vibration pen 3 is approximately 500 KHz, the arrival timing changes by approximately 450 n seconds in a range of 0° to 40° C. If the distance between the vibration pen 3 and the vibration sensor 6 is constant, the arrival timing linearly increases with the temperature. Since 450 n seconds corresponds to approximately a quarter period of the vibration, it is not negligible, and large. While 450 n seconds is shown as an example, the value changes as the vibration frequency and the pen shape change with the purpose of use of the device, and hence the value is only for reference purpose.

Of the factors (a), (b) and (c), the biggest factor in the calculation of the coordinate is (a), that is, the change in the vibration propagation time in the pen tip 5 and it occupies more than half of 450 n seconds. Since the plastic has a smaller sound velocity than that of a metal, an absolute value of the change in the propagation time by the change in temperature for a given propagation distance is larger. Accordingly, even if the length of the pen tip 5 is suppressed as much as possible, the difference in the propagation time mentioned above still results in.

The following proposals have been made to the problems encountered heretofore.

α) A known input point is indicated even if the surrounding temperature changes, so that the time offset obtained in advance is updated.

β) One or more vibration sensors are arranged to calculate the coordinate, and a variation in the time offset included by the same amount in the arrival timings of all vibration sensors is obtained, then the calculation of the distance and the coordinate is performed.

As described above, since the variation in the physical characteristic of the vibration pen 3 (electroacoustic transducer element) is large enough to affect to the performance of the device, the countermeasure to the change of the temperature is essential.

Besides the coordinate input device, the countermeasures for the various electronic equipments which are affected by change in temperature are classified as follows:

(1) The change in the characteristic of the electronic device such as the sensor by the change of temperature rises a problem:

The temperature is measured and the resulting data is corrected in accordance with the measured temperature. When a high precision is required, a temperature control mechanism for controlling the temperature of the electronic device at a constant level is provided.

(2) The change in temperature of the characteristic of the electronic circuit, particular the semiconductor device rises a problem:

A feedback loop is provided in the circuit to conduct the feedback control to produce a constant output. Alternatively, a reverse temperature characteristic of a temperature compensating passive element (typically a temperature compensating ceramic capacitor) is utilized to cancel the change in the characteristic of the semiconductor device by the change in temperature. The former is usually used to stabilize a gain of the amplifier or an oscillation frequency of an oscillator, and the latter is usually used for the same purpose but with a lower precision.

However, the prior art methods involve the following disadvantages:

1) In the construction of proposal α), it is necessary for the user of the device to frequently indicate the input point, which is troublesome. Further, since the input point is manually pointed by the user, the precision of calculating the coordinate is lowered.

2) In the construction of proposal β), one or more additional sensor is always required, which leads to the increase of the cost. Further, since the arrival timing used in calculating the variation of the time offset includes an error by the circuit, the calculated variation in the time offset also includes an error and the calculation precision of the coordinate is lowered as it is in α). Further, the prior art temperature compensation methods in other equipments include the following disadvantages:

a) In order to compensate the characteristic of the electronic device such as the sensor, a large scale arithmetic operation unit for measuring the temperature by a temperature sensor and processing it for compensation or a large scale temperature control system to keep the temperature constant is required. In any case, the apparatus is of large scale and expensive.

b) The prior art temperature compensation circuit is used to keep the circuit gain or the frequency constant or linearly change it with the temperature change, and it cannot compensate the phase of the signal or the detection timing of the signal.

The temperature compensating ceramic capacitor has a performance variation of ±5% even for a high precision type, and if the compensation circuit is constructed without selection of the capacitors to attain low cost, it is a factor of characteristic variation and since a temperature coefficient is several hundreds ppm/° C. at maximum, the range of temperature compensation is limited.

SUMMARY OF THE INVENTION

The invention has been made in view of the prior art mentioned above. It is an object of the present invention to provide a coordinate input device capable of compensating the temperature with following the change in temperature of the vibration pen even if there is a temperature difference between the vibration pen and the device body, by constructing small time difference generation means for compensating the temperature and mounting the means in a vibration pen.

It is other object of the present invention to provide a coordinate input device for detecting a vibration applied to a vibration transmitting member and calculating an input position of the vibration based on the detected vibration to produce a coordinate position as an input coordinate, comprising: detection means for detecting the vibration transmitting through said vibration transmitting member; measurement means for measuring a time from the generation of the vibration to the detection by said detection means; control means for controlling a timing to drive said measurement means; delay means for delaying the drive timing of said measurement means by said control means in accordance with a temperature; vibration input means for generating the vibration at the timing delayed by said delay means and inputting the vibration to said vibration transmitting member; and derive means for deriving the coordinate of the input position of the vibration by said vibration input means based on the time measured by said measurement means.

It is other object of the present invention to provide a coordinate input device for detecting a vibration applied to a vibration transmitting member and calculating an input position of the vibration based on the detected vibration to produce a coordinate position as an input coordinate, comprising: vibration input means for generating the vibration and applying the vibration to said vibration transmitting member; control means for controlling a timing to drive said vibration input means; detection means for detecting the vibration transmitting through said vibration transmitting member; delay means for delaying the drive timing of said vibration input means by said control means in accordance with temperature; measurement means for measuring a time before the vibration is detected by said detection means in accordance with the timing delayed by said delay means; and derive means for deriving the coordinate of the input position of the vibration by said vibration input means based on the time measured by said measurement means.

It is other object of the present invention to provide a coordinate input device which applies a vibration at a timing delayed relative to a timing to start the measurement of the vibration arrival time and changes the delay time in accordance with the temperature to compensate for a time difference to the detection of the vibration by the change of the temperature.

DETAILED DESCRIPTION OF THE PREFERRED EMBODIMENTS

First Embodiment

Figure 1:
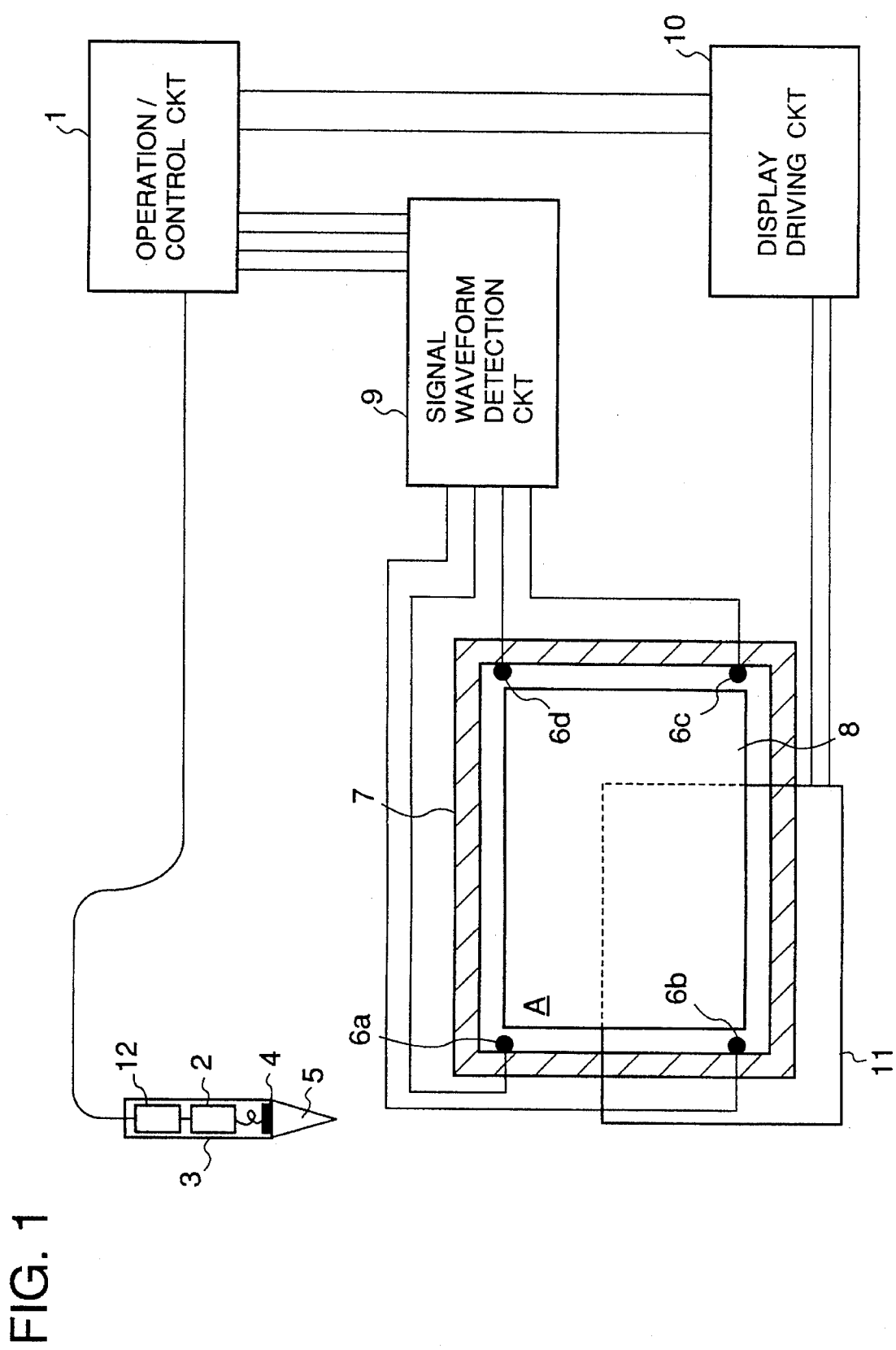
FIG. 1 shows a configuration of a coordinate input device.
Figure 2:
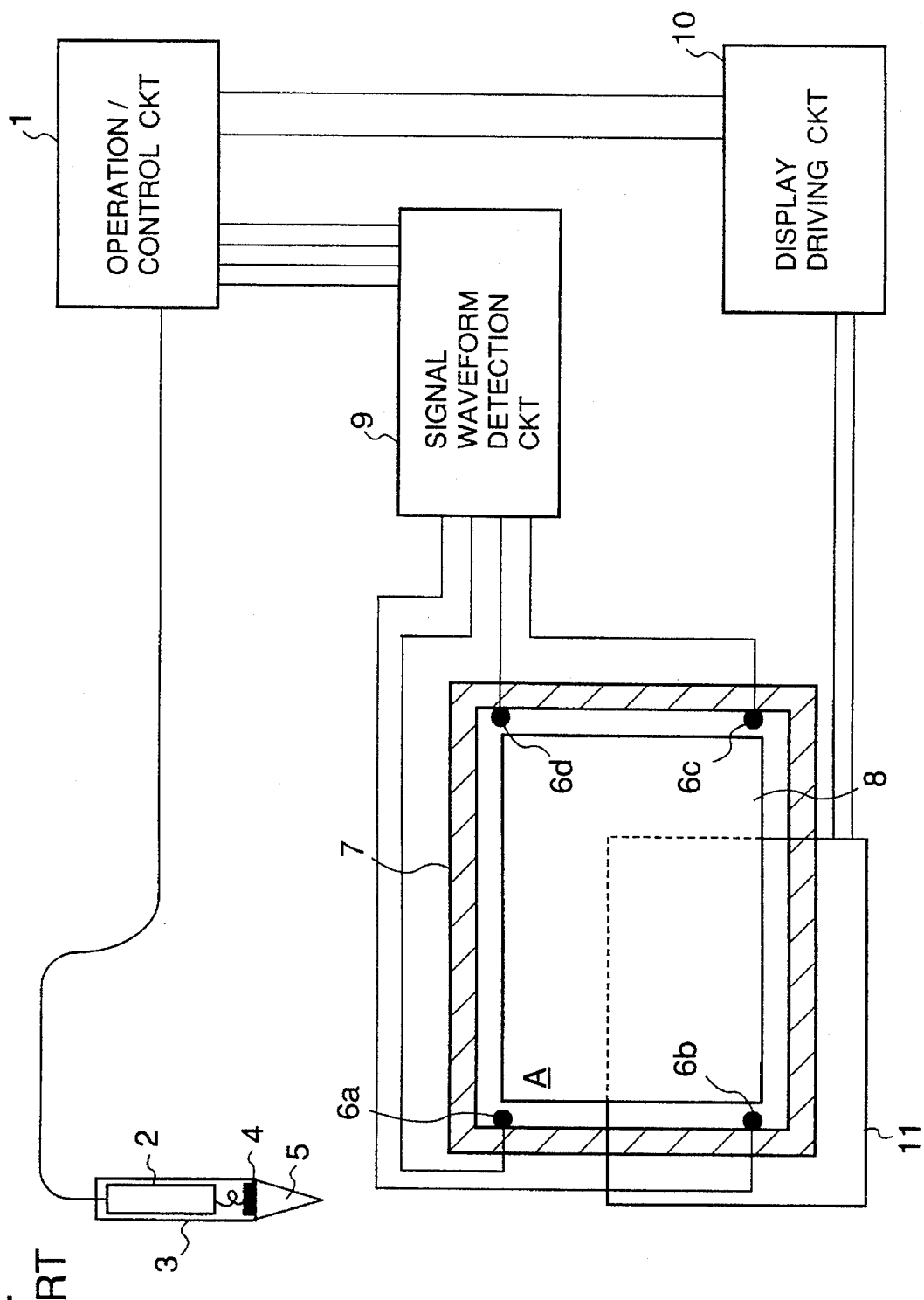
FIG. 2 shows a configuration of a prior art coordinate input device.

FIG. 1 shows a first embodiment of the present invention. A delay circuit 12 for delaying a drive timing by a predetermined time relative to a drive signal from an arithmetic operation and control circuit 1 is provided in a vibration pen 3. The delay time of the delay circuit 12 changes according to the temperature. The change is in the direction to cancel the change of the arrival time offset due to the change of the vibration propagation time in the pen tip 5. Namely, as the temperature rises, the delay time linearly decreases. A configuration of the delay circuit is shown in FIGS. 6A, 6B and 6C.

Figure 6A:
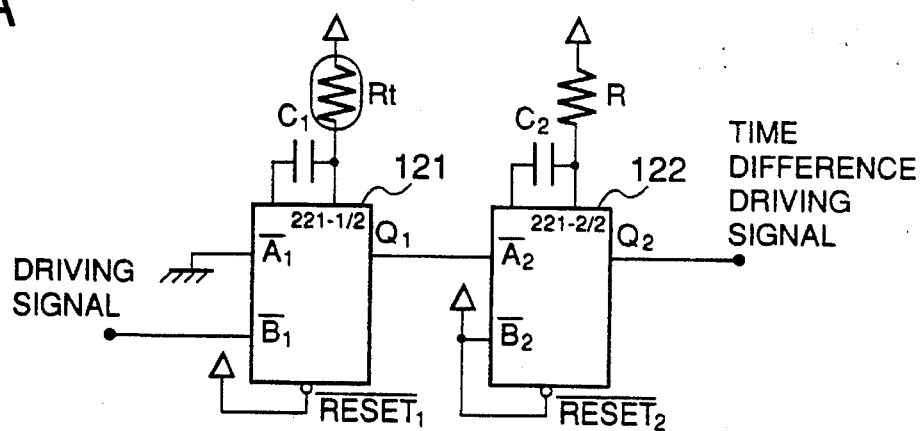
FIGS. 6A, 6B and 6C show block diagrams of a delay circuit.
Figure 6B:
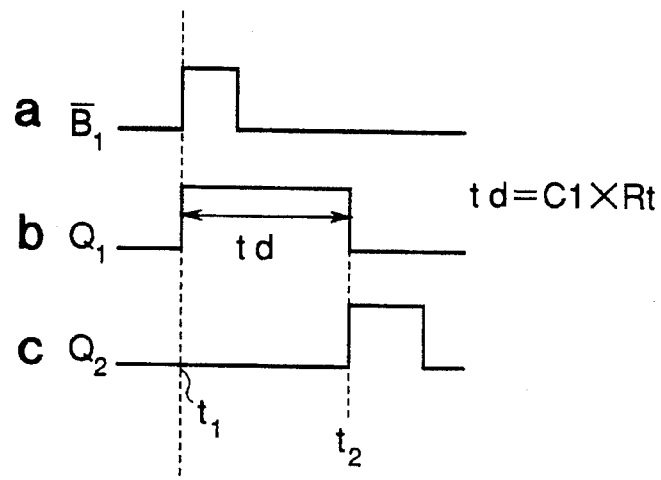
Figure 6C:
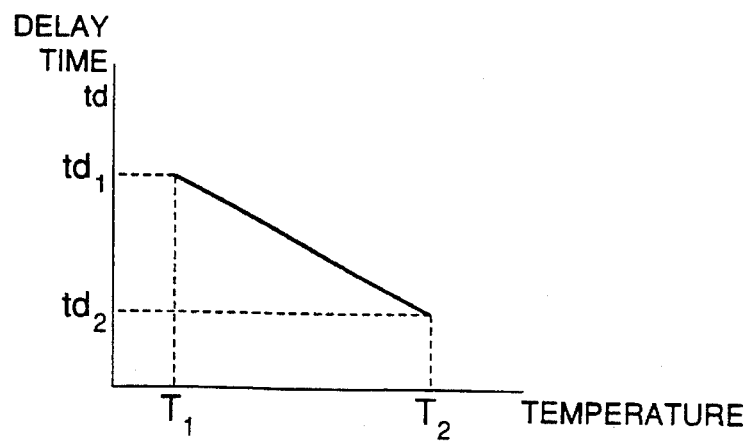

An IC used in FIG. 6A is a standard logic IC having two monostable multivibrators in one package. Referring to FIG. 6B showing waveforms at respective pins, an operation is explained. A symbol "/" is used to indicate a negative logic.

Figure 3:
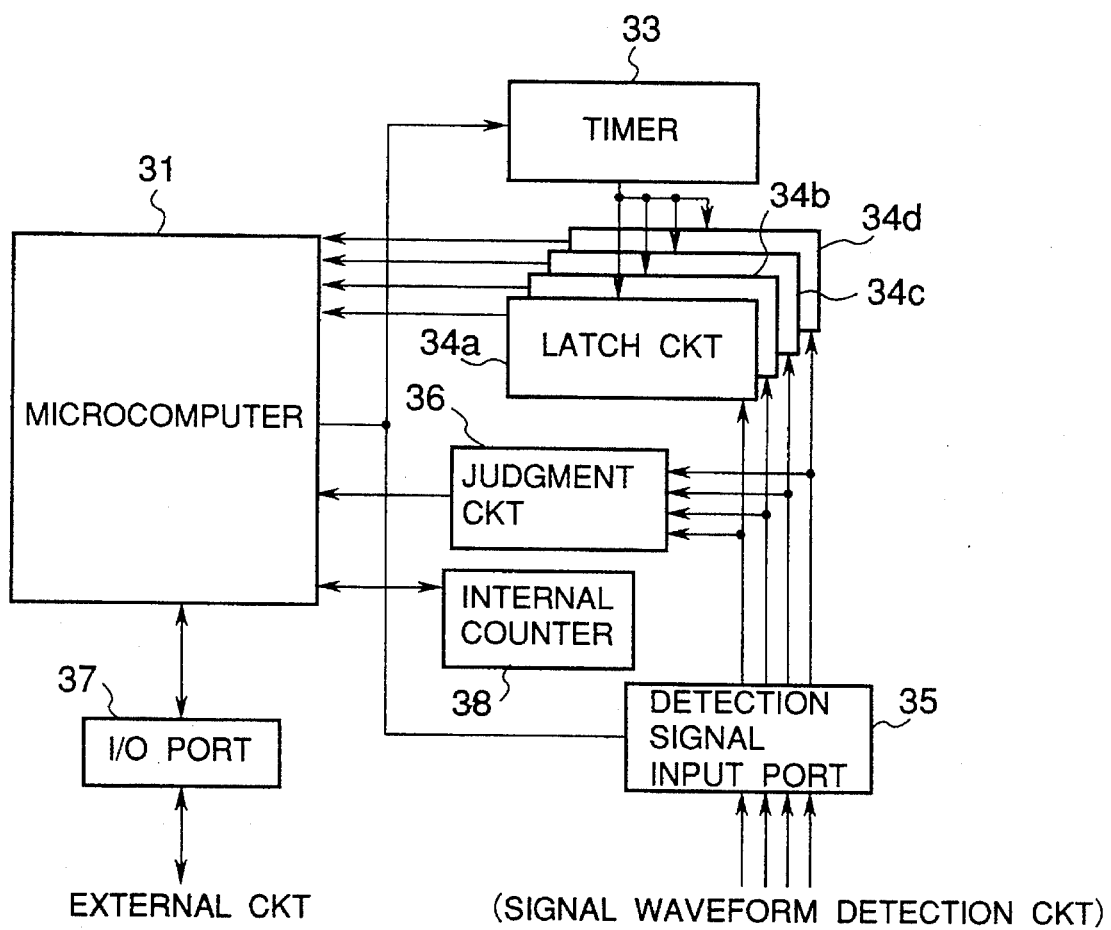
FIG. 3 shows a block diagram of an arithmetic operation and control circuit.

The arithmetic operation and control circuit 1 sends a drive signal (/B1 in the drawing) to the delay circuit 12 and starts an internal counter (a timer 33 in FIG. 3) which counts the arrival time of the vibration. At a rising time t1 of the drive signal/B1, the monostable multivibrator 121 outputs a pulse Q1. A pulse width td of the pulse Q1 is determined by a temperature sensitive resistor Rt and a capacitor C1 (td=Rt×C1). The temperature sensitive resistor Rt is an element whose resistance changes according to the temperature, such as a thermistor. At a falling timing t2 of the pulse Q1, the second monostable multivibrator 122 outputs a pulse Q2. A pulse width of the pulse Q2 is selected to efficiently drive the vibrator 4 in the vibration pen 3 and it is kept constant by a resistor R and a capacitor C2.

The resistance Rt of the temperature sensitive resistor is selected such that a variation Δtd of the delay time is Δtd=−450 n seconds (0°→40° C.) in order to cancel the change 450 n seconds (0°→40° C.) of the offset of the arrival time. In order that td linearly changes with the temperature, the change of Rt should be linear, and the design is easy because Δtd can be freely set in combination with C. As is apparent from the operation, the value of td itself is not critical but the value of Δtd is important because the timer 33 is started at the timing of the drive signal and counts an extra period corresponding to the delay time by the delay circuit 12 or the pulse width of Q1 but it does not raise a problem if the extra period is set small rather than the maximum count of the timer 33.

FIG. 6C shows a relation between the temperature and the delay time td. When the temperature changes from T1 to T2, the delay time td changes from td1 to td2. In the above example, T1=0° C. and T2=40° C., and Δtd=td2−td1=−450 n seconds.

In the present embodiment, it is intended to compensate for the temperature for the linear change of the time offset by the change in temperature. Depending on the material, the change in the sound velocity is not linear (for high viscosity material) and the linear change of the time offset may not always attained as the material of the pen tip 5 is changed to improve the feeding of writing. Thus, a temperature sensitive resistor element having linear resistance variation, a temperature sensitive resistor element having non-linear variation and a fixed resistor may be combined in series, parallel or bridge to set a required temperature variation characteristic of the resistor.

A typical example of the resistance to temperature characteristic of the thermistor as the non-linear variation element is explained. A reference temperature is set as a center temperature of an operation temperature range and a resistor of the thermistor at the reference temperature is given by R0. Then, the resistance of the thermistor at a given temperature is represented by:

$$R = R0 \times exp\{B \times (1/T - 1/T0)\} \quad (4)$$

where T and T0 are operating temperatures in absolute temperature, and B is a constant called as B constant which differs depending on element, and is approximately several thousands. It has a positive sign for an NTC thermistor and a minus sign for a PTC thermistor. As seen from the formula (4), the resistance of the thermistor exponentially decreases or increases with the temperature. In the delay circuit shown in FIGS. 6A, 6B and 6C, since the drive is delayed by the start timing of the timer, it is necessary that the pulse width is shortened as the temperature rises. Thus, the minus characteristic of the NTC thermistor may be used. In other embodiment to be described later, the plus characteristic of the PTC thermistor is required.

In the coordinate input device thus constructed, the time difference generation means for the temperature compensation is miniaturized and it is mounted in the vibration pen so that it follows the change of the temperature of the vibration pen even if there is a temperature difference between the vibration pen and the device body to compensate for the temperature. The change in the time offset due to the change in temperature is generated principally in the vibration pen and the ability to follow the change of the temperature of the vibration pen is a significant feature.

Second Embodiment

Figure 7:
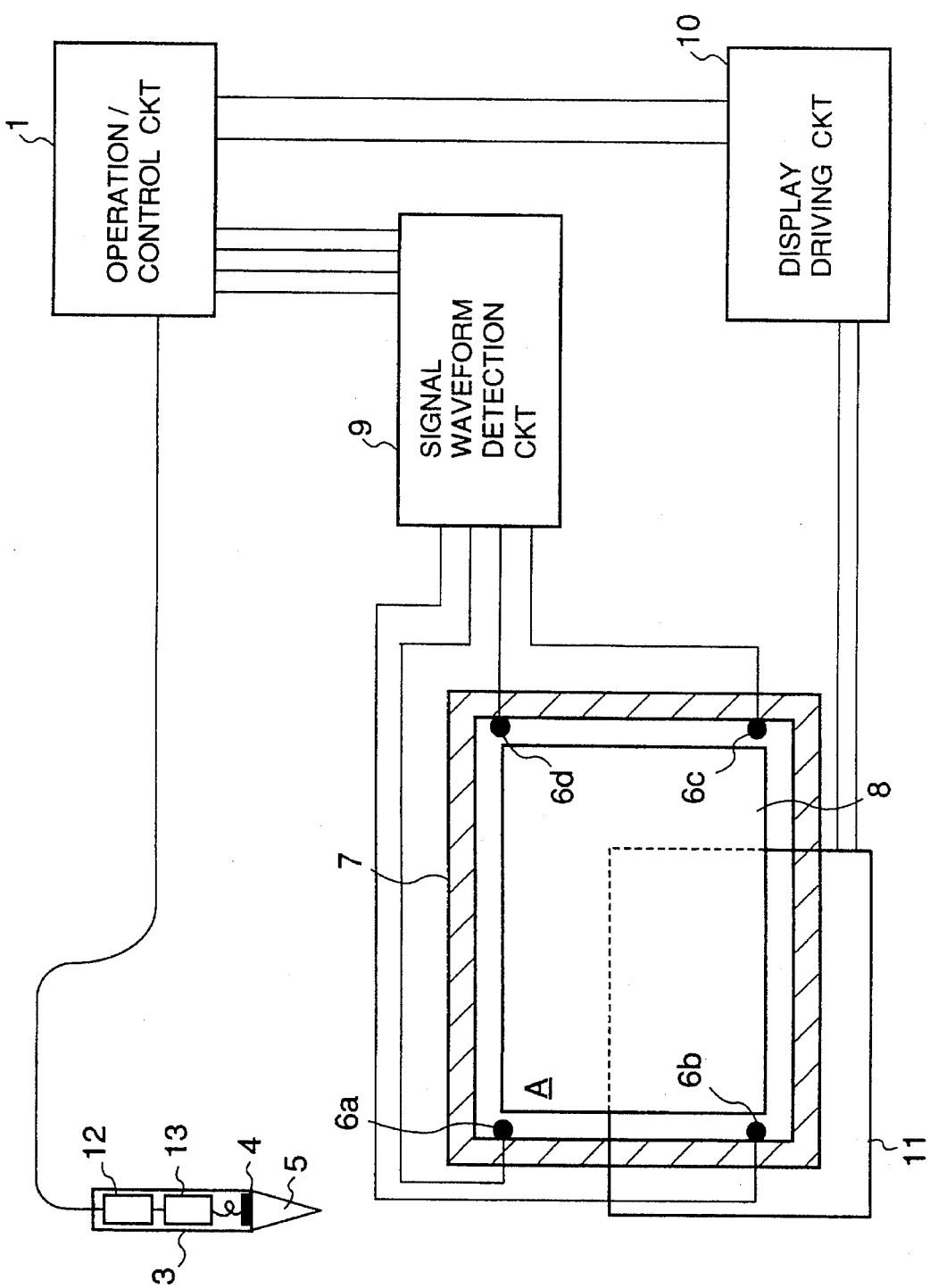
FIG. 7 shows a configuration of a second embodiment of the coordinate input device.

FIG. 7 shows a block diagram of a second embodiment of the coordinate input device. In the present embodiment, the drive signal is generated by an oscillation and drive circuit 13 arranged in the vibration pen 3. The delay circuit 12 may be identical to that of the first embodiment but the direction of input and output is reversed. Namely, the vibrator 4 is driven by the drive signal generated by the oscillation and drive circuit 13 (same as/B1 in the first embodiment), and at the same time the drive signal is applied to the delay circuit 12. Referring to FIGS. 6A to 6C and 8, the time difference drive signal Q2 delayed by the time td is sent to the arithmetic operation and control circuit 1 to start the internal timer 33. (The configuration of the arithmetic operation and control circuit 1 is identical to that shown in FIG. 3.) Namely, the start of counting is delayed by the delay circuit 12 relative to the drive timing of the vibration pen 3.

Accordingly, it is necessary to further delay the start timing of the counting as the temperature rises and the width of the pulse Q1 is linearly increased as the temperature changes. To this end, the positive characteristic temperature sensitive resistor element such as the PCT thermistor having plus B constant is selected.

As described above, by relatively shifting the drive timing and the start timing of the counter in accordance with the temperature change, the change in the time offset generated in the device can be cancelled for the change in temperature, and the highly reliable coordinate input device with the temperature compensation ability is attained.

Figure 4:
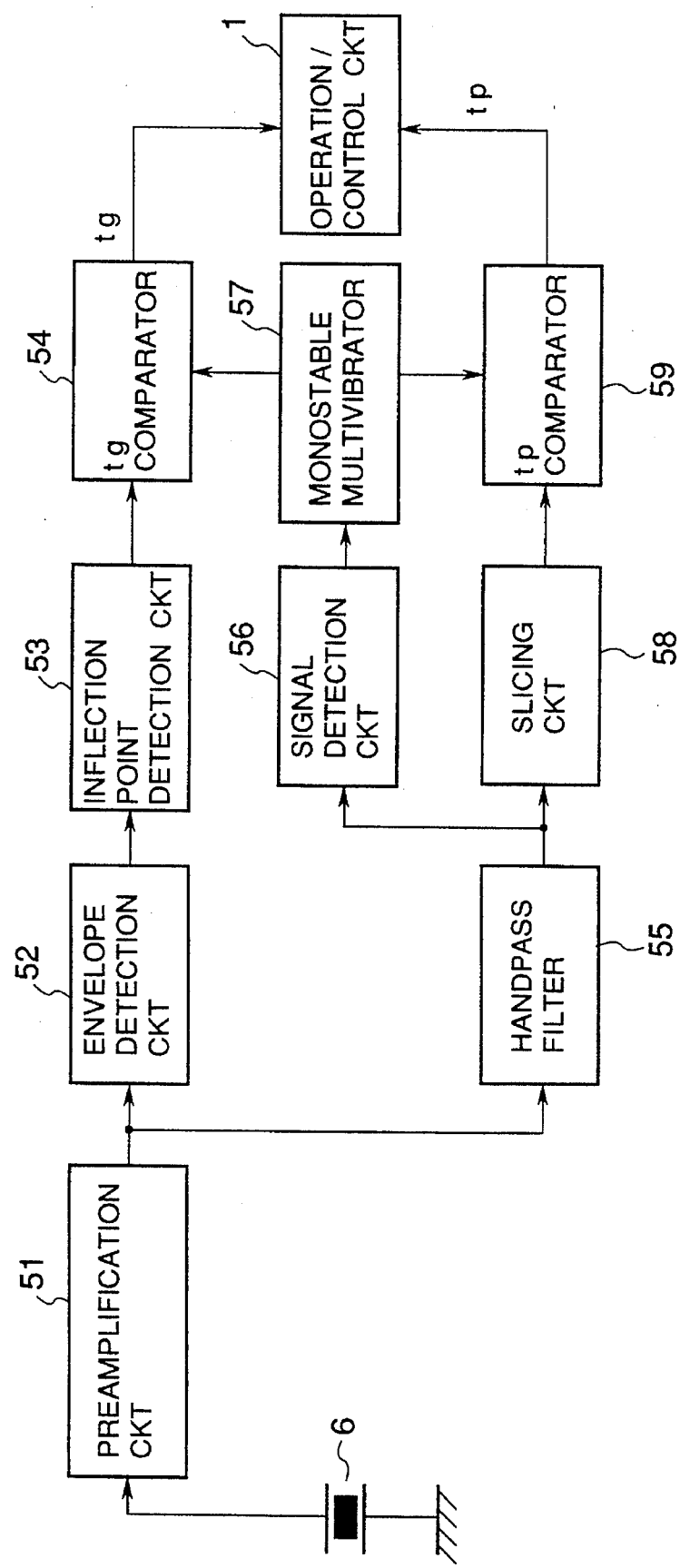
FIG. 4 shows a block diagram of a configuration of a signal waveform detection circuit.
Figure 5:
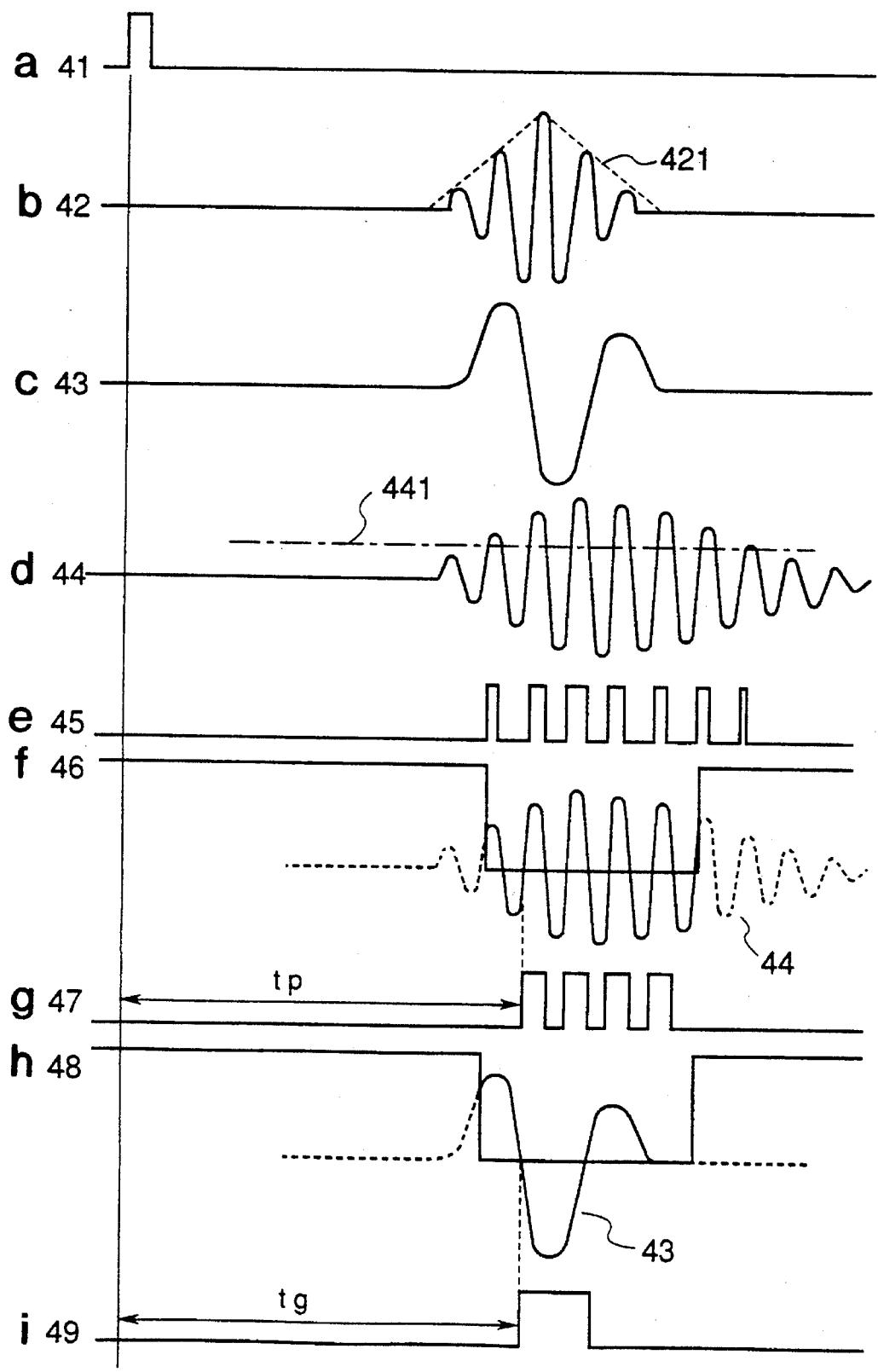
FIG. 5 shows a timing chart of waveforms for signal processing.

FIG. 4 shows a configuration of a signal waveform detection circuit 9 of a high precision coordinate input device which uses both the group arrival time tg and the phase arrival time tp, and FIG. 5 shows a principle of measurement of tp and tg. The same effect can be attained by a low precision coordinate input device which uses only the group arrival time tg, and it may also be applied to a coordinate input device for calculating the coordinate by utilizing Lamb wave having a small difference between the group velocity and the phase velocity (by limiting the compression of the vibration transmitting plate 8, the vibration frequency and the vibration mode) and detecting only the phase arrival time.

The present invention may be applied to a system comprising a plurality cf equipments or a system comprising a single equipment. The present invention may also be applied to a system or apparatus implemented by supplying program.

In accordance with the present invention, the coordinate input device has an advantage that the time difference generation means for the temperature compensation which can be mounted in the vibration pen can be miniaturized, and it can follow the change in temperature of the vibration pen even if there is a temperature difference between the vibration pen and the device body to attain the temperature compensation.

What is claimed is:

1. A coordinate input device for detecting a vibration applied to a vibration transmitting member and calculating an input position of the vibration based on the detected vibration to produce a coordinate position as an input coordinate, comprising:

detection means for detecting the vibration transmitting through said vibration transmitting member;

measurement means for measuring a time from the generation of the vibration to the detection by said detection means;

control means for controlling a timing to drive said measurement means;

delay means for delaying the drive timing of said measurement means by said control means in accordance with a temperature;

vibration input means for generating the vibration at the timing delayed by said delay means and inputting the vibration to said vibration transmitting member; and derive means for deriving the coordinate of the input position of the vibration by said vibration input means based on the time measured by said measurement means.

2. A device according to claim 1, wherein said delay means includes a temperature sensitive resistor having a resistance varied in accordance with the temperature and a capacitor, and the delay time is determined by the resistance of said temperature sensitive resistor and the capacitance of said capacitor.

3. A coordinate input device for detecting a vibration applied to a vibration transmitting member and calculating an input position of the vibration based on the detected vibration to produce a coordinate position as an input coordinate, comprising:

vibration input means for generating the vibration and applying the vibration to said vibration transmitting member;

control means for controlling a timing to drive said vibration input means;

detection means for detecting the vibration transmitting through said vibration transmitting member;

delay means for delaying the drive timing of said vibration input means by said control means in accordance with temperature;

measurement means for measuring a time before the vibration is detected by said detection means in accordance with the timing delayed by said delay means; and derive means for deriving the coordinate of the input position of the vibration by said vibration input means based on the time measured by said measurement means.

4. A device according to claim 3, wherein said delay means includes a temperature sensitive resistor having a resistance varied in accordance with the temperature and a capacitor, and the delay time is determined by the resistance of said temperature sensitive resistor and the capacitance of said capacitor.

* * * * *

UNITED STATES PATENT AND TRADEMARK OFFICE
CERTIFICATE OF CORRECTION

PATENT NO. : 5,610,838
DATED : March 11, 1997
INVENTOR(S) : MASAKI TOKIOKA ET AL.

It is certified that error appears in the above-indentified patent and that said Letters Patent is hereby corrected as shown below:

TITLE PAGE:
AT [56] REFERENCES CITED

U.S. Patent Documents,
    "5,097,915  3/1992  Yoshimura et al." should read
    --5,097,415  3/1992  Yoshimura et al.--.

COLUMN 1

Line 24, "a" should read --to a--.

COLUMN 2

Line 14, "comprise" should read --comprise a--.

COLUMN 4

Line 67, "results in." should read --results.--.

COLUMN 5

Line 20, "rises" should read --raises--.
    Line 28, "particular" should read --particularly-- and "rises" should read --raises--.

COLUMN 6

Line 20, "other" should read --another--.
    Line 38, "other" should read --another--.
    Line 56, "other" should read --another--.

UNITED STATES PATENT AND TRADEMARK OFFICE
CERTIFICATE OF CORRECTION

PATENT NO. : 5,610,838
DATED : March 11, 1997
INVENTOR(S) : MASAKI TOKIOKA ET AL.

It is certified that error appears in the above-indentified patent and that said Letters Patent is hereby corrected as shown below:

COLUMN 8

Line 8, "attained" should read --be attained--.

COLUMN 9

Line 27, "of equipments" should read --of equipment--.

Signed and Sealed this

Thirtieth Day of September, 1997

Attest:

BRUCE LEHMAN

Attesting Officer     *Commissioner of Patents and Trademarks*